United States Patent Office 2,855,254
Patented Oct. 7, 1958

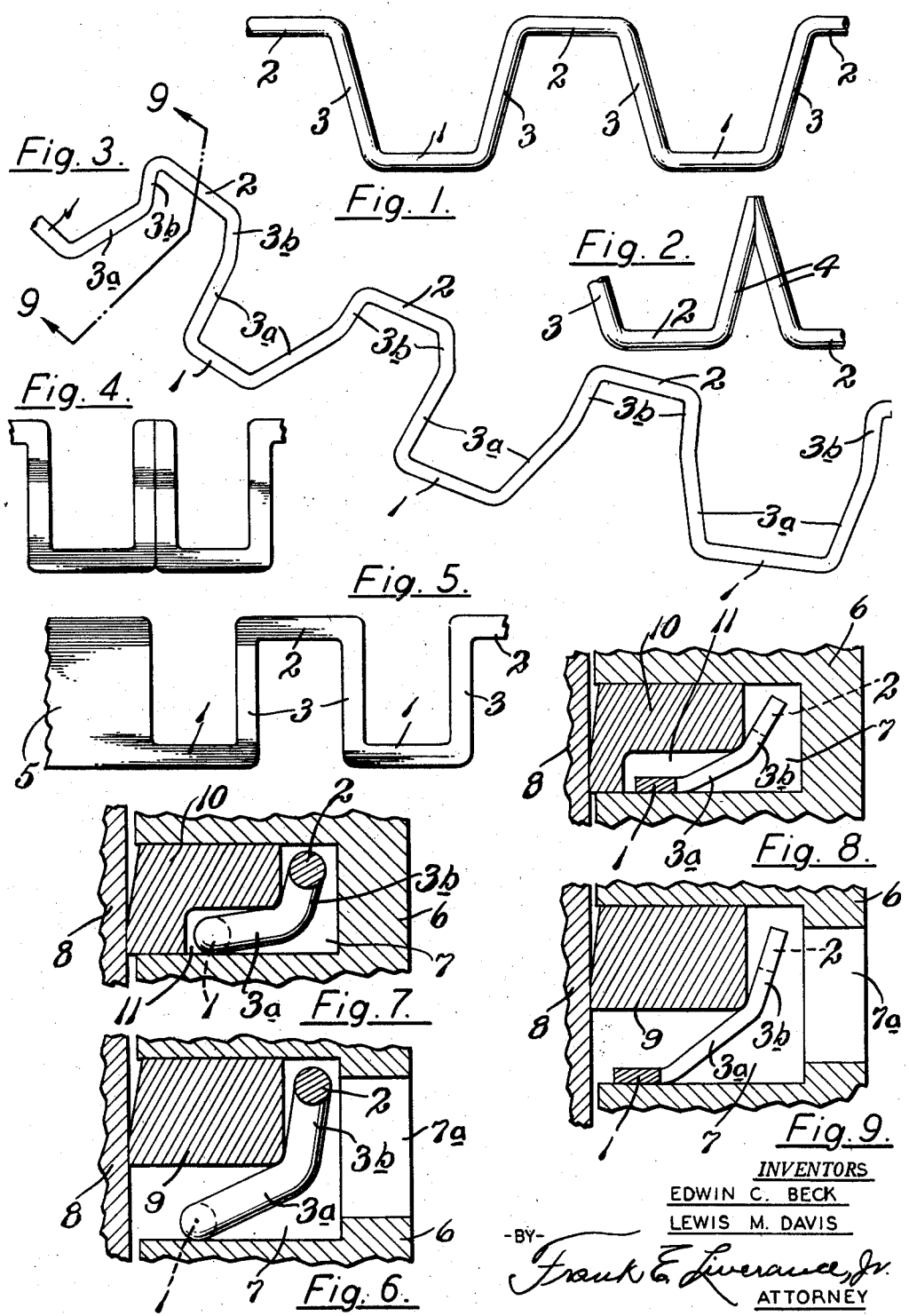

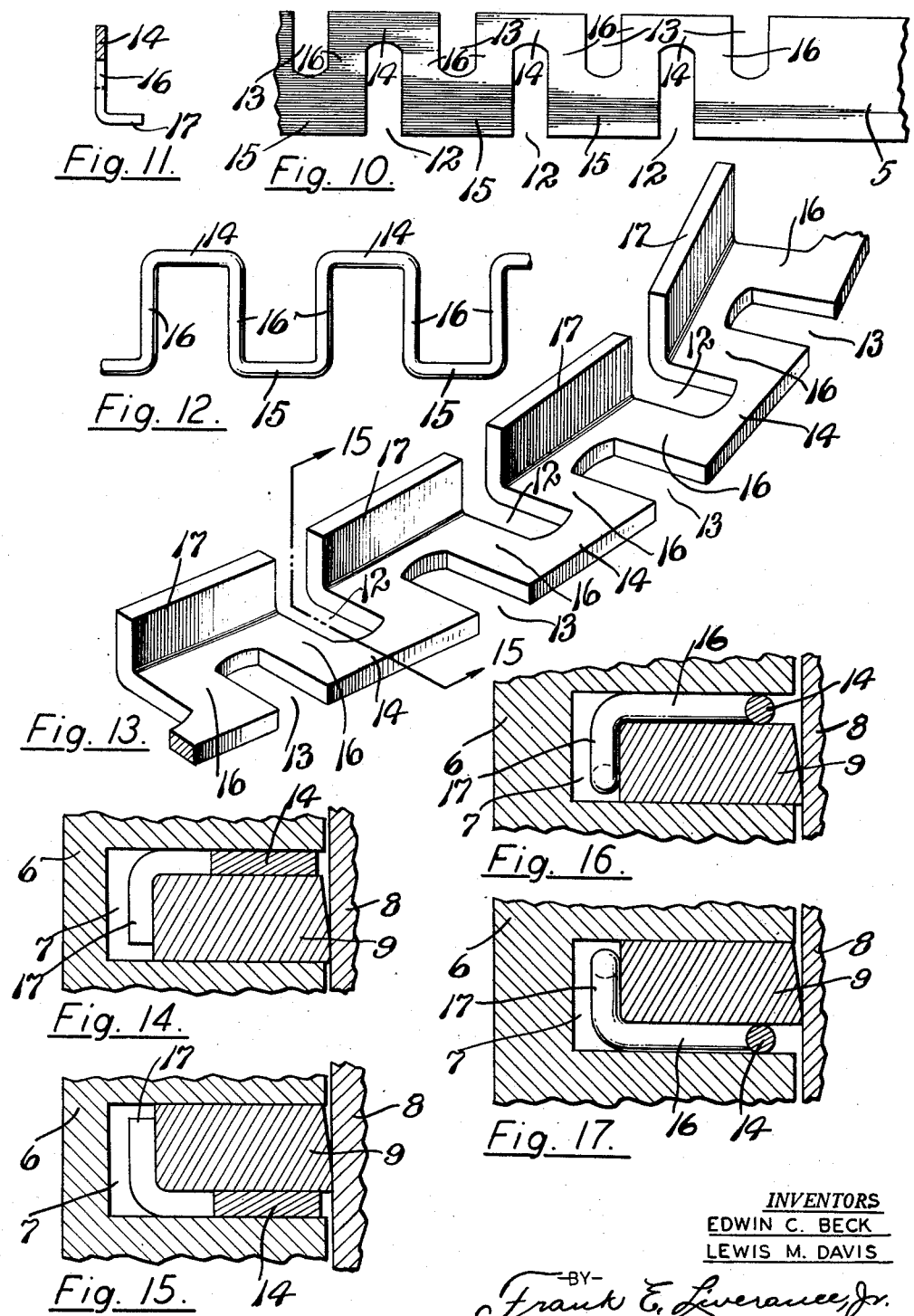

2,855,254

COMPRESSIBLE TWO-WAY PISTON RING EXPANDER

Edwin C. Beck and Lewis M. Davis, Muskegon, Mich., assignors to Sealed Power Corporation, Muskegon, Mich., a corporation of Michigan Application April 5, 1956, Serial No. 576,411

6 Claims. (Cl. 309—40)

This invention relates to a piston ring combined with a compressible two-way piston ring sealing expander which expander, in practice, is located in the groove of a piston and by reason of its circumferential compressibility and the manner in which it is assembled with a piston ring, forces the ring against a cylinder wall with desired unit pressure and also moves the piston ring in a direction to bear against a side of the piston ring groove. In this manner a sealing of the ring where it contacts the cylinder wall and also where it engages against a side of the ring groove provides two seals against high temperature and compression vacuum forces, adequately scrapes excess oil from the cylinder wall with ample ventilation for return to the crankcase, and stabilizes or dampens the piston against rocking action and thereby reduces or eliminates piston slap and wear against the cylinders. The piston ring and expander which is used therewith are of novel design and shape and accomplishes the purposes for which made, attaining not only economy in manufacture but high economic performance as well; and is useable both for new and service installations.

An understanding of the invention may be had from the following description, taken in connection with the accompanying drawings, in which, Fig. 1 is an enlarged fragmentary elevation of a section of the novel ring expander of our invention after the first step in its construction.

Fig. 2 is a similar elevation illustrating the abutting end portions of the expander which, being of circular form, has its two ends engaging and abutting against each other.

Fig. 3 is an enlarged perspective view of a section of the circular expander after it has been completed from the structure shown in Fig. 1.

Fig. 4 is an elevation similar to Figs. 1 and 2 showing a fragmentary, enlarged portion of the compressible expander at its abutting end portions made from a flat metal instead of round wire as in Figs. 1, 2 and 3.

Fig. 5 shows such modified or changed structure illustrating the steps of providing from sheet metal a structure similar to that in Fig. 1 from elongated flat ribbon metal stock.

Figs. 6, 7, 8 and 9 are transverse vertical sections through fragmentary portions of a piston, at a ring groove therein and associated cylinder, each showing a completed expander and piston ring acted upon thereby in a ring groove, the expanders made of the round wire in Figs. 5 and 6 and of the flat wire in Figs. 8 and 9.

Fig. 10 is a fragmentary enlarged plan of a length of ribbon stock material showing the first step of producing a modified form of expander, cut with alternate inward slots spaced from each other at opposite side edges of the ribbon stock.

Fig. 11 is a transverse section of the flat metal ribbon stock after the second step of construction which consists in bending it longitudinally between opposite longitudinal side edges to provide two portions at right angles to each other.

Fig. 12 shows a form equivalent to that shown in Fig. 10 using round wire.

Fig. 13 is a fragmentary enlarged section of the completed expander with the two longitudinal portions thereof at right angles, and Figs. 14, 15, 16 and 17 are fragmentary vertical sections, each of a piston at a ring groove thereof, with a cylinder installed carrying a piston ring of our invention associated therewith as used.

Like reference characters refer to like parts in the different figures of the drawings.

In Fig. 1 to provide the novel compressible expander of our invention used with a piston ring, a wire rod is corrugated to provide alternate opposite crowns 1 and 2 connected by the legs 3. Such corrugated expander is made in the form of a circle, the two end legs 4 (Fig. 2) coming together and abutting against each other. The expander is completed by bending the legs 3 between their ends so as to extend upwardly and inwardly from the sections 1, being disposed in two portions 3a and 3b, which are at an obtuse angle to each other.

The same bending longitudinally of the circular parted expander is done with the type of structure illustrated in Fig. 5, the legs 3 being similarly bent upwardly and inwardly from the lower horizontal connecting crowns 1. In all the forms shown in Fig. 3, also Figs. 6 and 7 and in that made from the structure shown in Fig. 5 shown in use in Figs. 8 and 9, the legs 3a extend upwardly and inwardly at an acute angle to the horizontal and the upper legs 3b extend upwardly and inwardly from the upper ends of the parts 3a at an increased or larger acute angle to the horizontal. The angular relation of the leg sections 3a and 3b, provides an obtuse angle with a rounded bend at the integral juncture of sections 3a and 3b in both forms described.

In Figs. 6 to 9 inclusive, a vertical sectional portion of a piston 6 at a piston ring groove 7 therein is shown with the fragmentary portion of the generally vertical cylinder wall 8 in which the piston is installed. In Figs. 6 and 9 a parted piston ring 9 of the cast iron compression type is placed in the groove 7 after the expander of our invention has first been put in such groove. The lower inner corner of the piston ring 9 is rounded to conform to the curvature at the inner side at the bend where the leg sections 3a and 3b are integrally connected, being seated against such bends of the legs so that the piston ring 9 is pressed against at a large number of spaced points around it at its lower inner corner.

The expender with its ends abutting, in its normal free state has a greater circumference than it will have when thus installed in a piston ring groove and the piston and the ring and expander installed in an engine cylinder. The expander is circumferentially compressed, being decreased in circumference length. The spring material from which the expander is made, yieldingly resists such compression with a generation of forces which causes a ring 9 to be forced outwardly to press against the cylinder wall with a desired unit pressure. Also the ring 9 is moved upwardly against the upper side of the ring groove 7 and seals against such upper side of the groove. In the form shown in Figs. 6 and 9 there are drainage passages 7a from the bottom of the ring groove 7 to the interior of the piston. There is ample and free ventilation for the passage of oil scraped by the ring 9 from the cylinder wall into the groove below the ring 9, such oil being returned to the engine crankcase through drainage openings at 7a.

In Figs. 7 and 8 the usual cast iron rings 10 at their outer portions are of greater thickness extending the full vertical height of the groove 7, the inner portions of the ring being of lesser height and cut away at their under sides and rear portions to make a continuous annular space 11. The expanders, either of the form made from round wire as in Fig. 7, or from flat wire as in Fig. 8, are installed in piston ring grooves the same as previously described, and the bends in the legs at the connected sections 3a and 3b thereof come against the lower inner rounded corners of the piston ring at those portions thereof above the annular spaces or grooves 11 in the rings.

In Figs. 10 to 13 inclusive, a somewhat modified form of the expander is made. In Figs. 10 and 11 a length of thin ribbon stock 5 has slots 12 and 13 cut at spaced distances from each other inwardly from the opposite sides of the ribbon 5, the slots 13 being of lesser length than the slots 12. There is thus provided successive portions 15 between the longer slots 12, and alternate portions 14 between the shorter slots 13, which parts 14 and 15 are connected by short legs 16. A generally equivalent structure is shown in the corrugated round wire member shown in Fig. 12.

With both forms, the legs 16 in Fig. 12 and the parts 15 in Fig. 10 are bent to extend outwardly at right angles from the remaining portions of the expander, that is, flanges 17 are bent at right angles from each of the portions 15 so that such flanges 17 are at right angles to the legs 16 and the parts 14 which connect them in the forms shown in Figs. 10, 11 and 14. The legs 16 in the form shown in Fig. 12 will be merely bent so that its two portions are at right angles to each other instead of the obtuse angular relation shown in Fig. 3.

A piston ring 9, in the installation shown in Figs. 15 and 17 at their upper sides come against the upper side of the ring groove 7 and rest at their lower sides upon the portions 14 and the legs extending therefrom, the flanges 17 extending vertically and bearing against the inner curved edges of the ring. In Figs. 14 and 16 the ring in each is in the lower portion of the ring groove and the expander is reversed so that flanges 17 extend downwardly from the upper horizontal portions of the expander. In all forms the expander is circumferentially compressed and lessened in its circumferential length and the rings 9 are forced outwardly to bear against a cylinder wall 8. The rings 9 are sealed against passage of compression gases or lubricant around the ring by the horizontal portions of the expanders, whether above or below a ring 9.

With the structure described a very economical yet sturdy and dependable expander to be used in combination with a piston ring is provided. Such expander is free from any necessity of bearing against the bottom of a ring groove. It provides a better seal against blow-by or lubricant passage, sealing both the contacting surfaces of the piston ring and a cylinder wall and of the piston ring against a side of a piston ring groove. It aids in dampening rocking movements of the piston normally following from the continually changing angle of connecting rods connecting the piston wrist pins with the crankshaft of an engine, which is especially a problem in connection with internal combustion engines having the modern shorter and the larger diameter piston, now increasingly used.

The invention is defined in the appended claims and is to be considered comprehensive of all forms of structure coming within their scope.

We claim:

1. In combination, a parted, circular piston ring, and a parted, circular, circumferentially compressible expander having successive U-shaped sections with spaced closed end portions alternately at opposite longitudinal edge portions of said expander and generally transverse legs connecting ends of opposite closed ends of said U-shaped sections, said expander, between opposite longitudinal edges thereof being bent on a line parallel to the longitudinal edges thereof, said expander being located with one longitudinal portion thereof inside of, and spaced from the inner curved sides of the piston ring, and the opposite longitudinal portion adjacent a flat side of said ring, and with the piston ring bearing against said legs substantially only at said bent portion thereof.

2. In combination, a parted, circular piston ring having a generally rectangular cross section, and a parted, circular, circumferentially compressible expander pressing against the lower inner corner of said piston ring, and having portions extending from said corner upwardly back of and spaced from said piston ring, and other portions extending from said corner outwardly under the adjacent lower flat side thereof and spaced therefrom.

3. In combination, a parted circular, piston ring having a generally rectangular cross section, and a parted, circular, circumferentially compressible expander comprising a continuous successive series of wire corrugations, the legs of said corrugations each having two sections connected by a bend and lying at an obtuse angle to each other, the lower portions of said corrugations extending outwardly from said bend under and spaced from the lower side of said piston ring, the lower inner corner of said piston ring bearing against said bend at the junctions of the angularly disposed sections thereof, and the upper portions of said corrugations extending upwardly from said bend and away from the inner curved sides of said ring.

4. In combination, a parted, circular piston ring of generally rectangular cross section and a parted, circular, circumferentially compressible expander seated in a piston ring groove, said expander having two circumferentially compressible portions extending circumferentially which are disposed at an obtuse angle relative to each other and connected by a circumferentially extending bend, said ring and expander being located in said groove with the ring bearing against the upper side face of the groove and with said bend bearing against the lower inner corner of the ring, one of said portions of the expander extending upwardly from said bend in back of said ring and spaced from the inner curved side thereof, the other portion of the expander extending downwardly and outwardly from said bend between said ring and the lower side face of the groove, said last mentioned portion of the expander being spaced from the lower face of the ring and extending downwardly from said bend at an angle inclined to the plane of said ring and the plane of the lower face of the groove, said last mentioned portion of the expander bearing against the lower side face of the groove only at the free end portion thereof.

5. The combination called for in claim 4 wherein the portion of the lower side face of the groove that is engaged by said free end portion of the expander is located in its entirety radially outwardly of said lower inner corner of the piston ring.

6. The combination called for in claim 5 wherein said lower inner corner of the piston ring is defined by the inner curved side of the piston ring and an annular groove on the lower flat face of the piston ring which extends radially inwardly to said inner curved side of the ring, said last mentioned portion of said expander being disposed generally within said annular groove on the piston.

References Cited in the file of this patent

UNITED STATES PATENTS

| 2,695,825 | Estey | Nov. 30, 1954 |
| 2,713,527 | Hsia-Si Pien | July 19, 1955 |
| 2,785,029 | Davis | Mar. 12, 1957 |
| 2,785,030 | Olson | Mar. 12, 1957 |